United States Patent [19]
Schuster et al.

[11] Patent Number: 5,647,533
[45] Date of Patent: Jul. 15, 1997

[54] RUN TIME CRITERIA TO CONTROL INDOOR BLOWER SPEED

[75] Inventors: Don A. Schuster, Martinsville; Larry J. Burkhart; Hongmei Liang, both of Indianapolis; Frederick J. Keller, Jr., Martinsville, all of Ind.

[73] Assignee: Carrier Corporation, Syracuse, N.Y.

[21] Appl. No.: 448,038

[22] Filed: May 23, 1995

[51] Int. Cl.$^6$ .............. G05D 23/00; F25B 19/00
[52] U.S. Cl. .............. 237/2 B; 62/231; 165/270
[58] Field of Search .............. 165/12, 29 F; 62/186, 231; 236/49.3, 11; 237/2 B

[56] References Cited

U.S. PATENT DOCUMENTS

| | | |
|---|---|---|
| 4,751,825 | 6/1988 | Voorhis et al. .............. 62/234 |
| 4,860,552 | 8/1989 | Becky .............. 237/2 B |
| 5,078,318 | 1/1992 | Kawai et al. .............. 237/2 B |
| 5,179,841 | 1/1993 | Phillips et al. .............. 62/81 |
| 5,248,083 | 9/1993 | Adams et al. .............. 236/11 |
| 5,332,028 | 7/1994 | Marris .............. 165/1 |

Primary Examiner—William E. Wayner

[57] ABSTRACT

A method is described of selectively varying the speed of the indoor blower of a heat pump for heating a building or other indoor area when ambient temperature drops below a predetermined level, in order to reduce the cold blow effect of air entering the building. The operating run time fraction of a heating cycle is determined, and the speed of the indoor blower is adjusted when the run time fraction crosses a predetermined threshold value, except that the speed of the indoor blower is maintained when the run time fraction is sufficiently changed compared with a previous run time fraction.

20 Claims, 2 Drawing Sheets

RUN TIME CRITERIA TO CONTROL INDOOR BLOWER SPEED

FIELD OF THE INVENTION

This invention relates generally to heat pump systems, and specifically to criteria for varying the speed of an indoor blower of a heat pump system for heating a building or other indoor area, in order to reduce the cold blow effect of air entering the building.

BACKGROUND AND SUMMARY OF THE INVENTION

Users have complained, since the commercial introduction of heat pumps, about heat pumps blowing "cold" air. The problem is multiplied as the outdoor ambient temperature drops since the heat pump runs for longer periods of time and the heat pump's ability to transfer heat is reduced. One solution to the problem is to use a complicated system of thermostats, wires and relays to reduce the indoor airflow as the outdoor ambient drops. This would require a technician to install a thermostat outside of the dwelling, string wires from the outdoor thermostat to the indoor unit, install the relays, and adjust the thermostat to the proper setting.

Another method employed in the field is to use a thermostatic sensor in the supply air duct to adjust the supply air flow lower as the supply air temperature drops. System operation would be adversely affected by the setting of the sensor, the quality of the duct work, and the condition of the air filtering system.

A more desirable means of controlling the air flow is to use an electronic control board with electro-mechanical means to adjust the indoor airflow. As the outdoor ambient drops, the heat pump runs for longer periods of time, so that operating on-time of the heat pump comprises a greater fraction of the total cycle time. The heat pump on-time can be tracked as a fraction of total operating time, or "run time fraction." The run time fraction is inversely related, nearly linearly, to the outdoor ambient temperature. Based on dwelling heat load and the capacity of the heat pump, the heat pump cycles on and off in a predictable pattern. The controller can be programmed to reduce the indoor airflow based on run time because heat pumps are installed based on common equipment sizing practices. When the system run time is greater than the controller's set run time, the indoor airflow is reduced. As the outdoor ambient temperature increases, the controller increases the airflow to ensure efficient and reliable operation of the heat pump.

It is therefore a primary object of the present invention to provide a heat pump system that reduces the "cold blow" effect associated with cold ambient temperatures.

It is a further object of the present invention to reduce the "cold blow" effect by running the blower at lower speeds when ambient temperatures are cold (i.e., below 50 F.).

A still further object of the present invention is to reduce the "cold blow" effect by adjusting the blower when the run time fraction (the ratio of heat pump operating on-time to cycle-time) crosses a threshold value.

Another object of the present invention is to reduce the "cold blow" effect by maintaining the blower when the run time fraction is outside a predetermined range of an immediately previous run time fraction.

These and other objects of the present invention are attained by providing a method of selectively reducing the speed of an indoor blower of a heat pump when ambient temperature drops below a predetermined level in order to reduce the "cold blow" effect of air entering the building, by determining an operating run time fraction of a heating cycle, and reducing the speed of the indoor blower when the run time fraction crosses a predetermined threshold value. To avoid changing the speed of the indoor blower at undesirable times (e.g., when the thermostat has just been adjusted), the current speed of the indoor blower can be maintained (kept from changing) when the run time fraction has significantly changed from the run time fraction of a previous heating cycle.

BRIEF DESCRIPTION OF THE DRAWING

For a fuller understanding of the nature and objects of the invention, reference should be made to the following detailed description of a preferred mode of practicing the invention, read in connection with the accompanying drawing, in which.

DETAILED DESCRIPTION OF THE INVENTION

Figure 1:
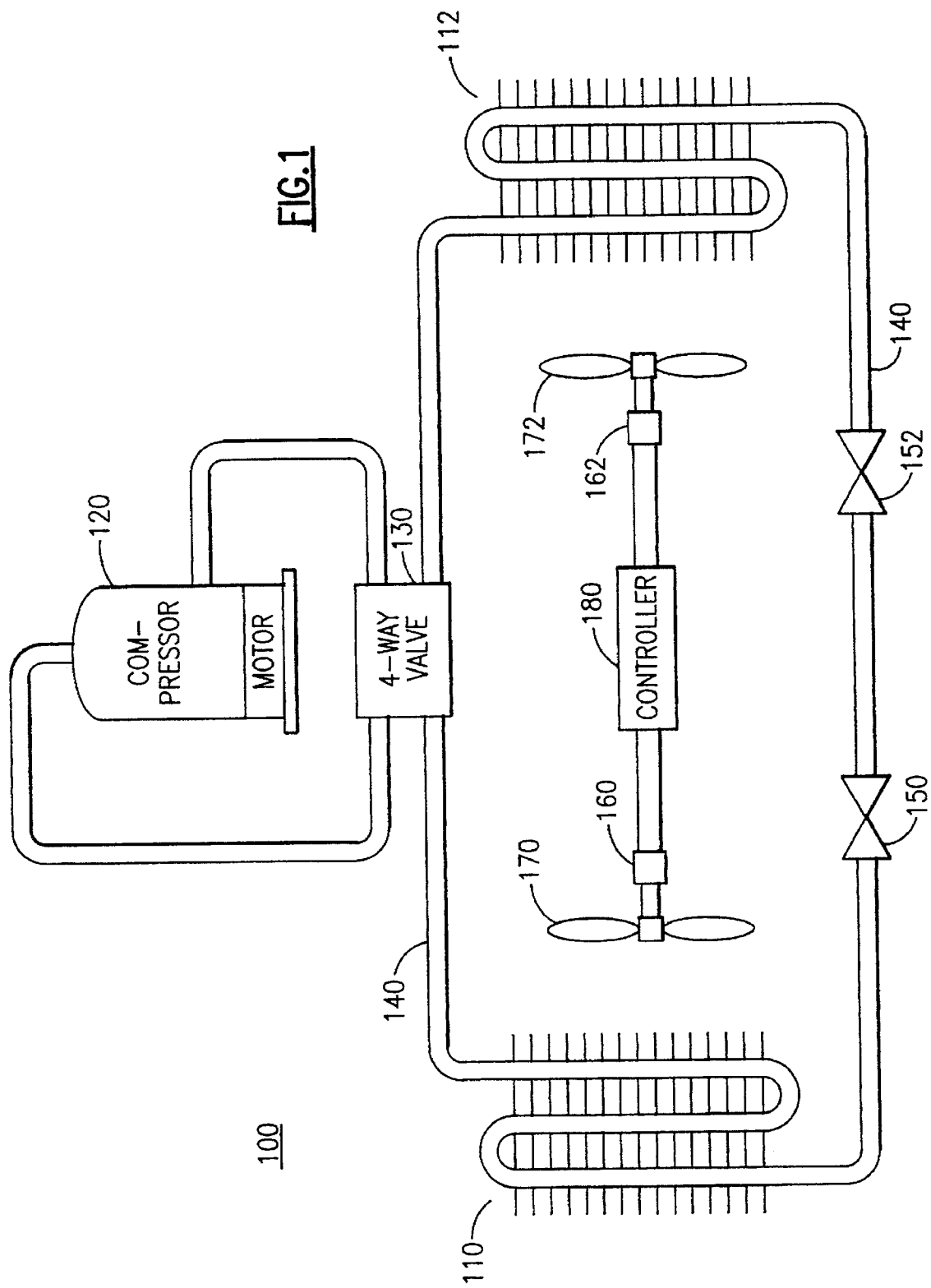
FIG. 1 is a block diagram of a heat pump system having the present invention incorporated therein.

Referring initially to FIG. 1, there is shown a heat pump system 100 comprising an indoor coil 110, an outdoor coil 112, a compressor 120 and a reversing valve 130. Installed in the line 140 between the indoor and outdoor coils 110 and 112, are bi-flow expansion valves 150 and 152, each having provisions for bypassing refrigerant when it is not acting as an expansion device, thus allowing refrigerant to flow in either direction through the expansion valves depending upon the heating or cooling mode. In coordination these components operate like a conventional heat pump system to provide cooling to the indoor space while operating in the air conditioning mode and heating to the indoor space while operating in a heating mode.

The motor 160 drives the blower 170 for the indoor coil 110, and the motor 162 drives the blower 172 for the outdoor coil 112. The unit controller 180 is in direct communication with the reversing valve 130 and controls the compressor 120, the outdoor fan motor 160, and the indoor blower 170.

Figure 2:
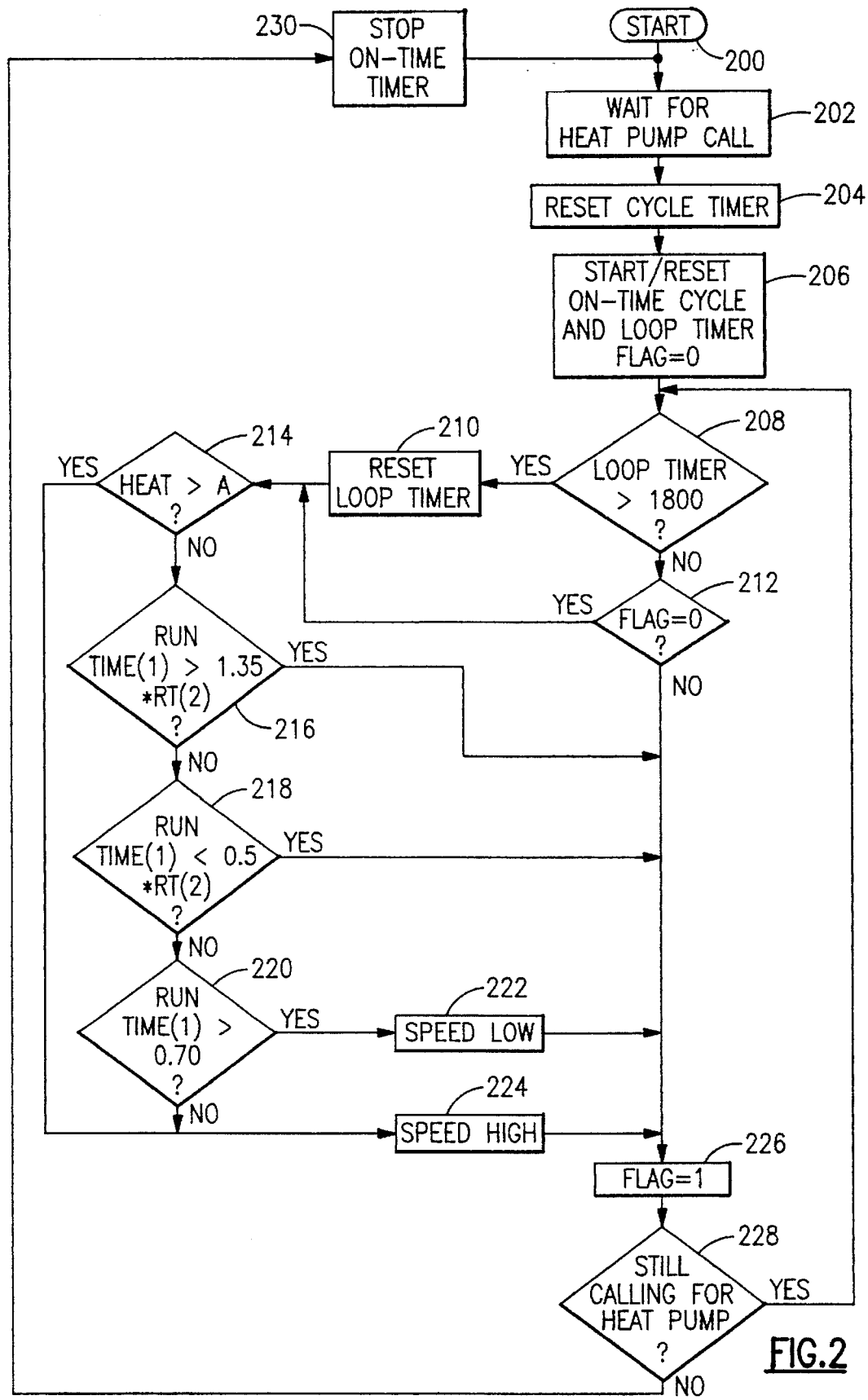
FIG. 2 is a flow diagram illustrating the run time criteria for varying the heat pump blower.

FIG. 2 is a flow diagram illustrating the preferred run time criteria for varying the heat pump blower. The method starts at step 200 and continues to step 202 where the control waits for a heat pump call. Once a heat pump call is received the cycle time timer "CT" is reset at step 204. The on-time timer "OT" and the loop timer "LT" are reset and started at step 206. The flag, FLAG, is reset to 0 at step 206. At step 208, if the loop timer is greater than a set value (optimally 1800 seconds, but could range from 900 to 3600 seconds), then control continues at step 210; if not, then control jumps to step 212. Loop timer is reset at step 210. If FLAG=0 at step 212, then control continues at step 214; if not, then control jumps to step 226. At step 214, if the heat level is high enough to satisfy comfort demands, then control jumps to step 224; if not, then control continues to step 216. At step 216, if the run time fraction ratio (the run time fraction for the last cycle, i.e. the primary run time fraction, divided by the run time fraction for the cycle immediately prior to the last cycle, i.e. the secondary run time fraction) is greater than an upper limit for the run time fraction ratio of 1.35, then control jumps to step 226; if not, then control continues to step 218. At step 218, if the run time fraction ratio is less than a lower limit for the run time fraction ratio of 0.5, then control jumps to step 226; if not, then control continues to step 220.

At step 220, if, the run time fraction for the last cycle is greater than a trigger value of 0.7, then control continues to step 222; if not, then control jumps to step 224. At step 222, the blower is reduced to (or left at) low speed and control jumps to step 226. At step 224, the blower is increased to (or left at) high speed and control continues to step 226.

FLAG is set to 1 at step 226. If a heat pump call is still present at step 228, then control returns to step 208 to pass through the run time criteria for speed reduction again; if not, then control continues at step 230. The on-time timer is stopped at step 230 and control returns to step 202 to wait for the next heat pump call.

Other values for the upper limit for the run time fraction ratio, the lower limit for the run time fraction ratio, and the trigger value may be used with this method. Also, two different values could be used for the trigger value, depending on the current speed of the blower (e.g., a "low speed trigger value" could be used to lower the blower when it is currently high, and a "high speed trigger value" could be used to raise the blower when it is currently high). In the preferred embodiment illustrated in the drawing, both "trigger values" checked at step 220 are identical.

Suggested useful ranges are 0.8 to 2.0 for the upper limit for the run time fraction ratio, 0.2 to 0.6 for the lower limit for the run time fraction ratio, and 0.5 to 1.0 for the trigger value(s).

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A method of selectively varying a speed of an indoor blower of a heat pump in order to reduce cold blow effect of air entering the heat pump, the method comprising the steps of:

determining primary and secondary run time fractions of primary and secondary heating cycles, respectively, where the primary heating cycle immediately preceeds the secondary heating cycle, the primary run time fraction being a function of heat pump operating on-time of the primary heating cycle and cycle-time of the primary heating cycle, the secondary run time fraction being a function of heat pump operating on-time of the secondary heating cycle and cycle-time of the secondary heating cycle, the primary and secondary heating cycles each being one complete respective cycle of the heat pump operating (on-time) and the heat pump not operating (off-time), cycle-time of each said respective cycle being the length of time of each complete said respective cycle (on-time plus off-time);

determining a run time fraction ratio that is a function of said primary and secondary run time fractions; and controlling the speed of the indoor blower dependent on the primary run time fraction and the run time fraction ratio.

2. The method of claim 1, wherein the step of controlling the speed of the indoor blower comprises the steps of:

maintaining the speed of the indoor blower when said run time fraction ratio is outside a ratio range defined by an upper limit for said run time fraction ratio and a lower limit for said run time fraction ratio; and lowering the speed of the indoor blower when said primary run time fraction is greater than a low speed trigger value and said run time fraction ratio is within the ratio range.

3. The method of claim 2, wherein the step of controlling the speed of the indoor blower further comprises the step of raising the speed of the indoor blower when said primary run time fraction is not greater than a high speed trigger value and said run time fraction ratio is within said ratio range.

4. The method of claim 3, wherein said operating primary run time fraction is said heat pump operating on-time of said primary heating cycle divided by said cycle-time of said primary heating cycle.

5. The method of claim 3, wherein said run time fraction ratio is said primary run time fraction divided by said secondary run time fraction.

6. The method of claim 4, wherein said run time fraction ratio is said primary run time fraction divided by said secondary run time fraction.

7. The method of claim 6, wherein said low and high speed trigger values are between 0.5 and 1.0, said lower limit for said run time fraction ratio is between 0.2 and 0.6, and said upper limit for said run time fraction ratio is between 0.8 and 2.0.

8. The method of claim 6, wherein said low and high speed trigger values are between 0.6 and 0.8, said lower limit for said run time fraction ratio is between 0.4 and 0.6, and said upper limit for said run time fraction ratio is between 1.2 and 1.5.

9. The method of claim 6, wherein said low and high speed trigger values are each approximately 0.7, said lower limit for said run time fraction ratio is approximately 0.5, and said upper limit for said run time fraction ratio is approximately 1.35.

10. A method of selectively varying a speed of an indoor blower of a heat pump in order to reduce cold blow effect of air entering the heat pump, the method comprising the steps of:

determining a run time fraction of a heating cycle, the run time fraction being a function of heat pump operating on-time and cycle-time of the heating cycle, the heating cycle being one complete respective cycle of the heat pump operating (on-time) and the heat pump not operating (off-time), cycle-time of the heating cycle being the length of time of the complete heating cycle (on-time plus off-time); and controlling the speed of the indoor blower dependent on the run time fraction of the heating cycle.

11. The method of claim 10, wherein the step of controlling the speed of the indoor blower comprises the step of lowering the speed of the indoor blower when said run time fraction is greater than a low speed trigger value.

12. The method of claim 11, wherein the step of controlling the speed of the indoor blower further comprises the step of raising the speed of the indoor blower when said run time fraction is not greater than a high speed trigger value.

13. The method of claim 11, wherein said run time fraction is said heat pump operating on-time divided by said cycle-time of the heating cycle.

14. The method of claim 11, wherein said low and high speed trigger values are between 0.5 and 1.0.

15. The method of claim 11, wherein said low and high speed trigger values are between 0.6 and 0.8.

16. The method of claim 11, wherein said low and high speed trigger values are each approximately 0.7.

17. The method of claim 12, wherein said run time fraction is said heat pump operating on-time divided by said cycle-time of the heating cycle.

18. The method of claim 12, wherein said low and high speed trigger values are between 0.5 and 1.0.

19. The method of claim 12, wherein said low and high speed trigger values are between 0.6 and 0.8.

20. The method of claim 12, wherein said low and high speed trigger values are each approximately 0.7.

* * * * *